(12) United States Patent
Schmidt et al.

(10) Patent No.: US 8,503,876 B2
(45) Date of Patent: Aug. 6, 2013

(54) VIEWER ACCESSORY FOR CAMERA

(75) Inventors: Louis J. Schmidt, Hermosa Beach, CA (US); Michael R. Schmidt, Hermosa Beach, CA (US); Robert P. Schmidt, West Hollywood, CA (US)

(73) Assignee: Hoodman Corporation, Torrance, CA (US)

( * ) Notice: Subject to any disclaimer, the term of this patent is extended or adjusted under 35 U.S.C. 154(b) by 1 day.

(21) Appl. No.: 13/274,375

(22) Filed: Oct. 17, 2011

(65) Prior Publication Data

US 2013/0094849 A1    Apr. 18, 2013

(51) Int. Cl.
  *G03B 13/02* (2006.01)
  *G03B 13/08* (2006.01)
  *G03B 17/02* (2006.01)
(52) U.S. Cl.
  USPC .......................... 396/383; 396/386; 396/536
(58) Field of Classification Search
  USPC ................ 396/373, 534, 383, 385–386, 544; 348/333.06; 359/604
  See application file for complete search history.

(56) References Cited

U.S. PATENT DOCUMENTS

| | | | | |
|---|---|---|---|---|
| 3,913,116 A | * | 10/1975 | Kastner et al. | 396/383 |
| 4,119,985 A | * | 10/1978 | Ando et al. | 396/383 |
| 5,465,132 A | * | 11/1995 | Mangelsdorf | 396/383 |
| 7,386,229 B2 | * | 6/2008 | Schmidt et al. | 396/534 |
| 7,885,537 B1 | * | 2/2011 | Kuss | 396/374 |

\* cited by examiner

*Primary Examiner* — Christopher Mahoney
(74) *Attorney, Agent, or Firm* — Fildes & Outland, P.C.

(57) ABSTRACT

A camera viewfinder viewer accessory includes an elongated body portion having first and second ends and a longitudinal axis. A connector for mounting the body portion to a camera viewfinder is located on a side of the body portion and adjacent to the first end. The body portion longitudinal axis is generally parallel to the camera viewfinder in a mounted disposition. An end assembly is connected to the body portion second end and is rotatable about the body portion longitudinal axis. A viewer assembly is connected to a side of the end assembly and has a longitudinal axis generally perpendicular to the body portion longitudinal axis. The viewer assembly extends away from the end assembly and terminates at an eyepiece. The viewer accessory directs an image from the camera viewfinder into the viewer assembly, to be viewed through the eyepiece in any rotatable disposition of the end assembly.

14 Claims, 3 Drawing Sheets

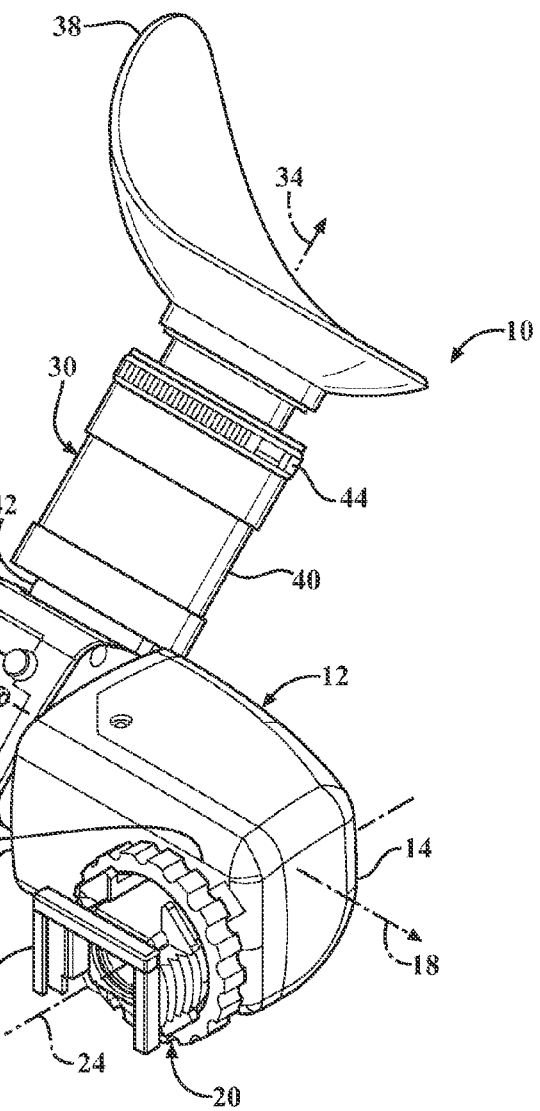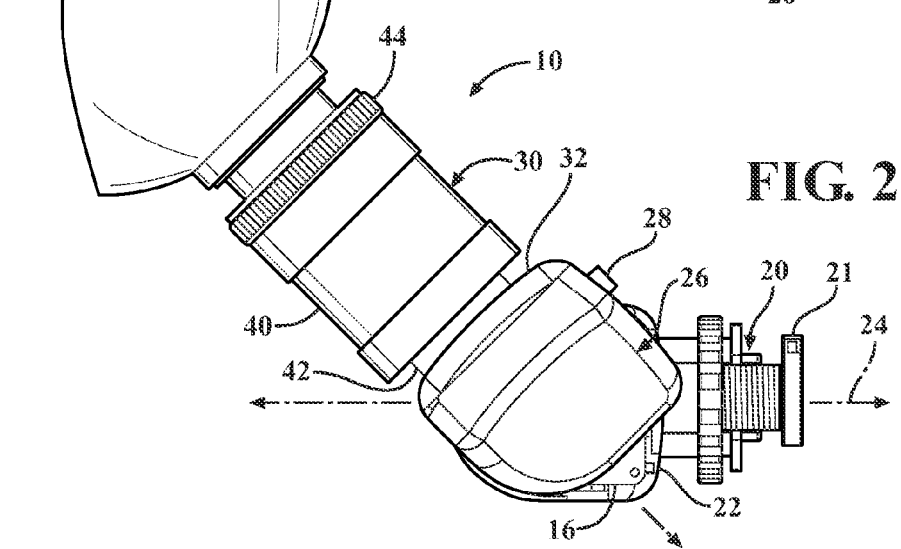

VIEWER ACCESSORY FOR CAMERA

TECHNICAL FIELD

This invention relates to cameras having a viewfinder, and more particularly to a camera viewfinder viewer accessory.

BACKGROUND OF THE INVENTION

It is known in the art relating to cameras and photography that when a photographer desires to utilize a low camera angle such as by placing a camera on a floor, there is not enough room for a photographer to look through the viewfinder to line up the shot without lying on the floor with one ear pressed to the floor. Similarly, another low angle shot, such as for photographing sporting events, requires placing the camera along the ground and tilting the camera up at a 20 degree angle. This camera orientation would require a photographer to dig a hole in the ground in order for the photographer to be able to position his/her head behind the camera to line up the shot.

To facilitate using the camera's viewfinder to line up these and other similar low camera angle shots, right angle viewers have been used to make low angle shots easier by using a mirror or a prism in a right-angle optical viewing tube that attaches to the camera viewfinder so that a photographer can comfortably line up a shot while looking from above the camera position. Conventional right angle viewers rotate 360 degrees while always staying parallel to the back side of the camera with the eyepiece always staying perpendicular (90 degrees) to the camera viewfinder.

SUMMARY OF THE INVENTION

The present invention provides a camera viewfinder viewer accessory that allows a photographer to rotate the viewing angle from a vertical 90 degree position (parallel to back side of camera with eyepiece 90 degrees relative to viewfinder and pointing upwards) through a position in which the eyepiece points back away from the camera to a downward 270 degree position. The adjustable orientation of the view accessory provides photographers with multiple options to find a comfortable viewing angle for any angle of shot. The present viewer accessory can also be mounted horizontally (relative to the camera viewfinder), which allows for 180 degrees of pan for viewing angles. The viewer accessory therefore accommodates multiple viewing angles of the camera's viewfinder. Also, the eyepiece of the viewer accessory is spaced from the camera when the view accessory is mounted on the camera so that a photographer does not have to press his/her face up against the back of the camera to look through the camera's viewfinder.

More particularly, a camera viewfinder viewer accessory in accordance with the present invention that is mountable on a camera viewfinder includes an elongated body portion having first and second ends and a longitudinal axis extending from the first end to the second end. A connector for mounting the body portion to the camera viewfinder is located on a side of the body portion and is adjacent to the first end. The longitudinal axis of the body portion is generally parallel to the camera viewfinder in a mounted disposition in which the body portion is mounted on the camera viewfinder. An end assembly is connected to the second end of the body portion and is rotatable about the longitudinal axis of the body portion. A viewer assembly is connected to a side of the end assembly and has a longitudinal axis generally perpendicular to the longitudinal axis of the body portion. The viewer assembly extends away from the end assembly and terminates at an eyepiece. Optics within the body portion and the end assembly direct a viewfinder image from the camera viewfinder into the body portion, redirect the image along the longitudinal axis of the body portion into the end assembly and along the longitudinal axis of the viewer assembly, to be viewed through the eyepiece in any rotatable disposition of the end assembly.

The viewer assembly may be pivotable through a range of 180 degrees of rotation. The viewer assembly may be adjustable to multiple positions about the longitudinal axis of the body portion. The viewer accessory may include a lock for locking the end assembly at one or more specific positions.

In a horizontal mounted disposition in which the longitudinal axis of the body portion is generally horizontally disposed relative to the camera, the viewer assembly may be pivotable generally 180 degrees between a first position in which the eyepiece faces upwards generally perpendicular to the camera viewfinder and a second position in which the eyepiece faces downwards and is generally perpendicular to the camera viewfinder. In the horizontal mounted disposition, the viewer assembly also may be pivotable to an intermediate third position in which the viewer assembly is horizontal relative to the camera and the eyepiece is generally parallel to the camera viewfinder. In a vertical mounted disposition in which the longitudinal axis of the body portion is generally vertically disposed relative to the camera, the viewer assembly may be pivotable generally 180 degrees between a left position in which the eyepiece faces to the left of the camera and is generally perpendicular to the camera viewfinder and a right position in which the eyepiece faces to the right of the camera and is generally perpendicular to the camera viewfinder. In the vertical mounted disposition, the viewer assembly also may be pivotable to an intermediate center position in which the eyepiece is generally parallel to the camera viewfinder.

The viewer assembly also may include an optical zoom that allows for magnification of an image viewed through the viewer accessory. The viewer assembly further may include a diopter adjustment that corrects for imperfect vision.

These and other features and advantages of the invention will be more fully understood from the following detailed description of the invention taken together with the accompanying drawings.

BRIEF DESCRIPTION OF THE DRAWINGS

In the drawings:

FIG. 1 is a perspective view of a camera viewfinder viewer accessory in accordance with the present invention;

FIG. 2 is a plan view of the camera viewfinder viewer accessory;

DETAILED DESCRIPTION OF THE INVENTION

Figure 3:
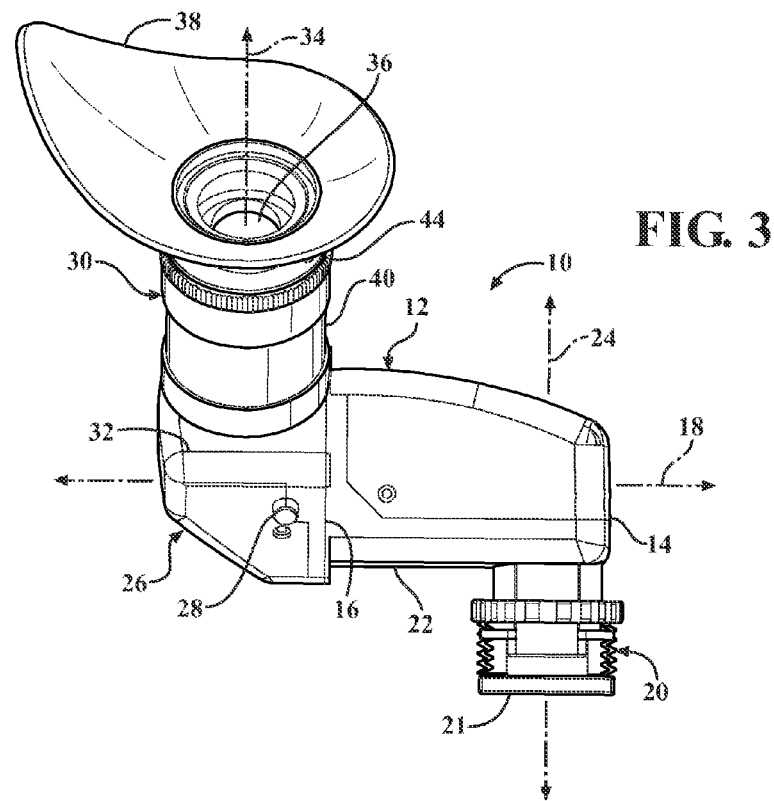
FIG. 3 is a side view of the camera viewfinder viewer accessory.

Referring now to the drawings in detail, numeral 10 generally indicates a camera viewfinder viewer accessory that is mountable on a camera viewfinder. The viewer accessory 10 allows a photographer to rotate the viewing angle of the viewfinder image generally 180 degrees, such as from a vertical position above the camera through a vertical position below the camera or from a horizontal position to the left of the camera through a horizontal position to the right of the camera. The range of motion of the viewer accessory provides a comfortable viewing angle for any angle of shot.

With reference to FIGS. 1-3, the viewer accessory 10 includes an elongated body portion 12 having a first end 14, a second end 16, and a longitudinal axis 18 extending from the first end to the second end. The body portion 12 may house some of the internal components (e.g., optics, mechanics) of the viewer accessory 10. The longitudinal axis 18 of the body portion 12 is generally parallel to the camera viewfinder in a mounted disposition in which the body portion is mounted on the camera (see below). More specifically, the longitudinal axis 18 of the body portion is generally parallel to a plane in which the camera viewfinder window lies. Since the camera viewfinder window is typically disposed on the back face of the camera, the longitudinal axis of the body portion 12 is generally parallel to the back face of the camera. In contrast, a longitudinal axis of a body portion of a conventional viewer accessory is generally perpendicular to the camera viewfinder window as well as to the back face of the camera.

A connector 20 is attached to a side 22 of the body portion 12 adjacent the first end 14. The connector may extend outwardly from the side of the body portion 12 and may include a mounting feature 21 at a terminal end that allows for mounting of the viewer accessory 10 on a camera viewfinder, such as to a frame of the viewfinder. The connector 20 has a longitudinal axis 24 that is generally perpendicular to the longitudinal axis 18 of the body portion and also generally perpendicular to the camera viewfinder window in a mounted disposition of the viewer accessory. The connector may also include a lens through which a viewfinder image passes into the connector and along the longitudinal axis 24 into the body portion 12.

An end assembly 26 is connected to the second end 16 of the body portion 12. The end assembly 26 is rotatable to multiple positions about the longitudinal axis 18 of the body portion 12. For example, the end assembly 26 may be rotated 180 degrees (½ turn) about the longitudinal axis 18 of the body portion 12. The end assembly 26 may also house internal components (optics, mechanics) of the viewer accessory 10. The end assembly 26 may include a releasable lock 28 that locks the end assembly at a plurality of specific positions which are indexed by the internal mechanics (such as ratcheting gears or similar) of the viewer accessory.

A viewer assembly 30 is connected to a side 32 of the end assembly 26. The viewer assembly 30 has a longitudinal axis 34 that is generally perpendicular to the longitudinal axis 18 of the body portion. The viewer assembly 30 extends away from the end assembly 26 and terminates at an eyepiece 36. The eyepiece 36 may include an eyecup 38 that is contoured to shield a photographer's eye sunlight or an artificial light source. The viewer assembly 30 also may include a diopter adjustment mechanism to correct for vision imperfections of the photographer using the viewer accessory 10. The diopter adjustment mechanism may be an adjustable telescoping tube 40 that is moveable about an inner tube 42 towards and away from the end assembly 26 to change the distance between the eyepiece 36 and the end assembly 30. The viewer assembly 30 may also include an optical zoom 44 that allows for magnification of the image viewed through the viewer accessory.

Optics within the body portion 12 and the end assembly 26 direct a viewfinder image from the camera viewfinder along the longitudinal axis 24 of the connector 20 and into the body portion, redirect the image along the longitudinal axis 18 of the body portion into the end assembly 26, and redirect the image along the longitudinal axis 34 of the viewer assembly 30 to be viewed through the eyepiece in any rotatable disposition of the end assembly 26 relative to the body portion 12. The optics that propagate the viewfinder image from the viewfinder to the eyepiece 36 may include a prism system such as a Pechan prism or similar.

Figure 4:
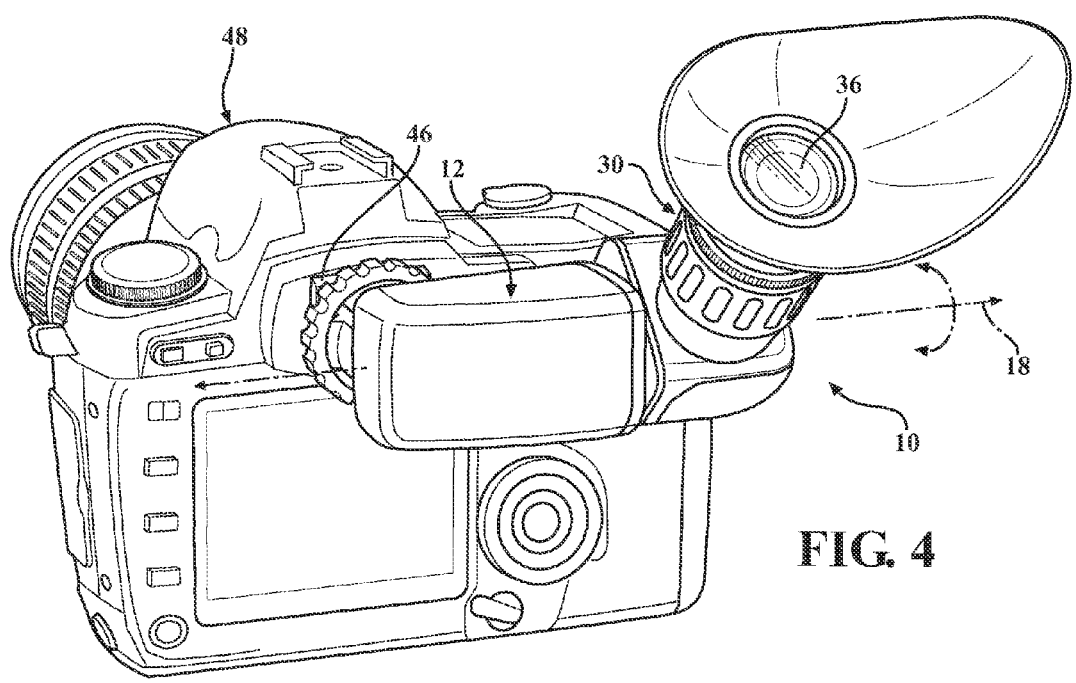
FIG. 4 is an environmental view of the viewer accessory mounted on a viewfinder of a camera in a vertical mounted disposition schematically illustrating rotatable movement of an eyepiece of the viewer accessory.

As shown in FIG. 4, in a horizontal mounted disposition the viewer accessory 10 is mounted on a viewfinder 46 of a camera 48 such that the longitudinal axis 18 of the body portion 12 is generally horizontally disposed relative to the camera and the viewer assembly 30 is rotatable along the vertical axis of the camera (i.e., from the bottom to the top of the camera). In the horizontal mounted disposition, the body portion 12 is generally horizontal relative to the camera 48 body. The viewer assembly 30 is pivotable generally 180 degrees between a first position in which the eyepiece 36 faces upwards and is generally perpendicular to the plane of the viewfinder 46 window and a second position in which the eyepiece 36 faces downwards and is generally perpendicular to the viewfinder 46 window. The viewer assembly is also pivotable at least to an intermediate third position in which the eyepiece 36 is horizontal relative to the camera and generally parallel to the plane of the viewfinder 46 window. The horizontal mounted disposition allows a photographer to compose shots through the viewfinder 46 with the camera 48 at virtually any angle above or below the photographer's eye.

Figure 5:
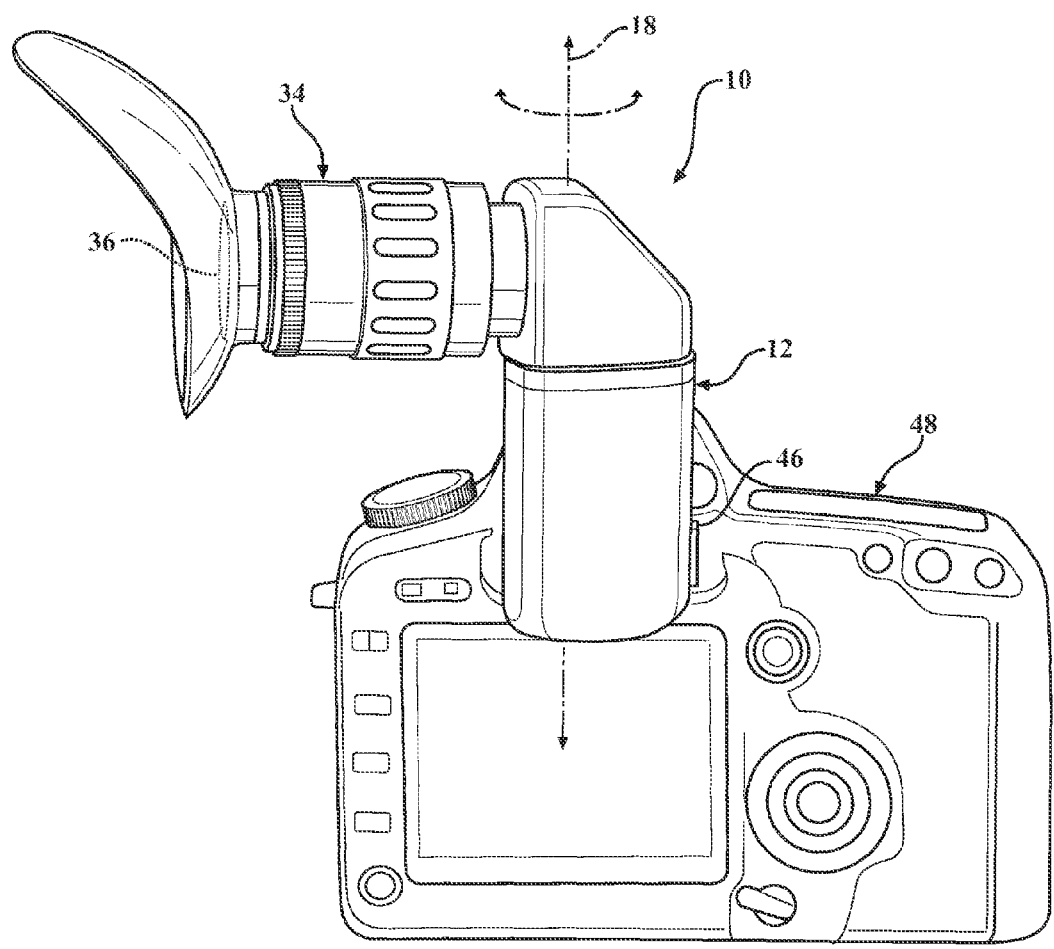
FIG. 5 is an environmental view of the viewer accessory mounted on a viewfinder of a camera in a horizontal mounted disposition schematically illustrating rotatable movement of the eyepiece of the viewer accessory.

As shown in FIG. 5, in a vertical mounted disposition the viewer accessory 10 is mounted on the camera viewfinder 46 such that the longitudinal axis of the body portion 12 is generally vertically disposed relative to the camera 48 and the viewer assembly 30 is rotatable along the horizontal axis of the camera (i.e., from the left side to the right side of the camera). In the vertical mounted disposition, the body portion 12 is generally vertical relative to the camera 48 body. The viewer assembly 34 is pivotable generally 180 degrees between a left position in which the eyepiece 36 faces directly to the left of the camera 48 and is generally perpendicular to the viewfinder 46 window and a right position in which the eyepiece 36 faces directly to the right of the camera 48 and is generally perpendicular to the viewfinder 46 window. The viewer assembly is also pivotable at least to an intermediate center position in which the eyepiece 36 is centered and generally parallel to the plane of the viewfinder 46 window. The vertical mounted disposition allows a photographer to compose shots through the viewfinder 46 with the camera 48 at virtually any angle to the left or right of the photographer's eye.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A camera viewfinder viewer accessory mountable on a camera viewfinder, the viewer accessory comprising:
   an elongated body portion having first and second ends and a longitudinal axis extending from said first end to said second end;
   a connector for mounting said body portion to the camera viewfinder is located on a side of said body portion and adjacent to said first end;

said longitudinal axis of said body portion being generally parallel to said camera viewfinder in a mounted disposition in which said body portion is mounted on the camera viewfinder;

an end assembly connected to the second end of said body portion and rotatable about said longitudinal axis of said body portion;

a viewer assembly connected to a side of said end assembly and having a longitudinal axis generally perpendicular to said longitudinal axis of said body portion, said viewer assembly extending away from said end assembly and terminating at an eyepiece; and a lock for locking said end assembly at one or more specific positions;

wherein a viewfinder image is directed from said camera viewfinder into said body portion, the image is redirected along said longitudinal axis of said body portion into said end assembly and along said longitudinal axis of said viewer assembly, to be viewed through said eyepiece in any rotatable disposition of said end assembly.

2. The camera viewfinder viewer accessory of claim 1, wherein said viewer assembly is pivotable through a range of 180 degrees of rotation.

3. The camera viewfinder viewer accessory of claim 1, wherein said viewer assembly is adjustable to multiple positions about said longitudinal axis of said body portion.

4. The camera viewfinder viewer accessory of claim 1, wherein in a horizontal mounted disposition in which said longitudinal axis of said body portion is generally horizontally disposed relative to the camera, said viewer assembly is pivotable generally 180 degrees between a first position in which said eyepiece faces upwards generally perpendicular to the camera viewfinder and a second position in which said eyepiece faces downwards and is generally perpendicular to the camera viewfinder.

5. The camera viewfinder viewer accessory of claim 4, wherein in said horizontal mounted disposition, said viewer assembly is pivotable to an intermediate third position in which said viewer assembly is horizontal relative to the camera and said eyepiece is generally parallel to the camera viewfinder.

6. The camera viewfinder viewer accessory of claim 1, wherein in a vertical mounted disposition in which said longitudinal axis of said body portion is generally vertically disposed relative to the camera, said viewer assembly is pivotable generally 180 degrees between a left position in which said eyepiece faces to the left of the camera and is generally perpendicular to the camera viewfinder and a right position in which said eyepiece faces to the right of the camera and is generally perpendicular to the camera viewfinder.

7. The camera viewfinder viewer accessory of claim 6, wherein in said vertical mounted disposition, said viewer assembly is pivotable to an intermediate center position in which said eyepiece is generally parallel to the camera viewfinder.

8. The camera viewfinder viewer accessory of claim 1, including an optical zoom for magnification of the image viewed through the viewer accessory.

9. The camera viewfinder viewer accessory of claim 1, wherein said viewer assembly includes a diopter adjustment.

10. A camera viewfinder viewer accessory mountable on a camera viewfinder, the viewer accessory comprising:

an elongated body portion having first and second ends and a longitudinal axis extending from said first end to said second end;

a connector for mounting said body portion to the camera viewfinder is located on a side of said body portion and adjacent to said first end;

said longitudinal axis of said body portion being generally parallel to said camera viewfinder in a mounted disposition in which said body portion is mounted on the camera viewfinder;

an end assembly connected to the second end of said body portion and rotatable about said longitudinal axis of said body portion;

a viewer assembly connected to a side of said end assembly and having a longitudinal axis generally perpendicular to said longitudinal axis of said body portion, said viewer assembly extending away from said end assembly and terminating at an eyepiece; and in a horizontal mounted disposition in which said longitudinal axis of said body portion is generally horizontally disposed relative to the camera, said viewer assembly is pivotable generally 180 degrees between a first position in which said eyepiece faces upwards generally perpendicular to the camera viewfinder and a second position in which said eyepiece faces downwards and is generally perpendicular to the camera viewfinder;

wherein a viewfinder image is directed from said camera viewfinder into said body portion, the image is redirected along said longitudinal axis of said body portion into said end assembly and along said longitudinal axis of said viewer assembly, to be viewed through said eyepiece in any rotatable disposition of said end assembly.

11. The camera viewfinder viewer accessory of claim 10, wherein said viewer assembly is adjustable to multiple positions about said longitudinal axis of said body portion.

12. The camera viewfinder viewer accessory of claim 10, wherein in said horizontal mounted disposition, said viewer assembly is pivotable to an intermediate third position in which said viewer assembly is horizontal relative to the camera and said eyepiece is generally parallel to the camera viewfinder.

13. The camera viewfinder viewer accessory of claim 10, including an optical zoom for magnification of the image viewed through the viewer accessory.

14. The camera viewfinder viewer accessory of claim 10, wherein said viewer assembly includes a diopter adjustment.

* * * * *